(12) United States Patent
Iida et al.

(10) Patent No.: US 9,081,172 B2
(45) Date of Patent: Jul. 14, 2015

(54) PRESSURE-SENSITIVE DISPLAY MEDIUM AND WRITING DISPLAY APPARATUS USING THE SAME

(75) Inventors: Kiyoshi Iida, Kanagawa (JP); Takayuki Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1361 days.

(21) Appl. No.: 12/541,459

(22) Filed: Aug. 14, 2009

(65) Prior Publication Data

US 2010/0177054 A1 Jul. 15, 2010

(30) Foreign Application Priority Data

Jan. 13, 2009 (JP) ................. P2009-004759

(51) Int. Cl.
*G09G 3/34* (2006.01)
*G02B 26/00* (2006.01)
*G06F 3/046* (2006.01)

(52) U.S. Cl.
CPC .............. *G02B 26/004* (2013.01); *G06F 3/046* (2013.01)

(58) Field of Classification Search
CPC .......... G02F 1/167; G09G 3/344; G09F 9/372
USPC ........................................ 345/107
See application file for complete search history.

(56) References Cited

U.S. PATENT DOCUMENTS

| | | | | |
|---|---|---|---|---|
| 6,067,185 A * | 5/2000 | Albert et al. | | 359/296 |
| 2001/0022632 A1* | 9/2001 | Umemoto et al. | | 349/12 |
| 2003/0175004 A1* | 9/2003 | Garito et al. | | 385/143 |
| 2003/0227441 A1 | 12/2003 | Hioki et al. | | |
| 2005/0285846 A1* | 12/2005 | Funaki | | 345/173 |
| 2006/0274036 A1 | 12/2006 | Hioki et al. | | |
| 2007/0146238 A1* | 6/2007 | Fork | | 345/55 |
| 2007/0146310 A1* | 6/2007 | Paolini et al. | | 345/107 |

FOREIGN PATENT DOCUMENTS

| | | |
|---|---|---|
| JP | A-10-217618 | 8/1998 |
| JP | A-2003-2687 | 1/2003 |
| JP | A-2004-46792 | 2/2004 |
| JP | A-2004-109402 | 4/2004 |
| JP | A-2004-170447 | 6/2004 |
| JP | A-2005-326596 | 11/2005 |
| JP | A-2006-139643 | 6/2006 |
| JP | A-2006-277492 | 10/2006 |
| JP | A-2007-206846 | 8/2007 |
| JP | A-2007-206907 | 8/2007 |

* cited by examiner

*Primary Examiner* — Mark Regn
(74) *Attorney, Agent, or Firm* — Oliff PLC

(57) ABSTRACT

A pressure-sensitive display medium includes a pair of transparent substrates, sealing members and a display layer. The pair of transparent substrates are opposed to each other with a distance therebetween. The sealing members seal peripheral fringes of the pair of transparent substrates. The display layer in which a composition obtained by infiltrating a fluidic material in a porous member is filled in a closed space enclosed with the pair of transparent substrates and the sealing members. When partial pressure is applied from the outside to one face of the transparent substrates, the fluidic material in the display layer at a position to which the pressure is applied is expelled from the porous member. After the pressure is released, the fluidic material having been expelled returns and flows into the porous member.

10 Claims, 6 Drawing Sheets

PRESSURE-SENSITIVE DISPLAY MEDIUM AND WRITING DISPLAY APPARATUS USING THE SAME

CROSS-REFERENCE TO RELATED APPLICATIONS

This application is based on and claims priority under 35 USC 119 from Japanese Patent Application No. 2009-4759 filed on Jan. 13, 2009.

BACKGROUND

1. Technical Field

The present invention relates to a pressure-sensitive display medium and a writing display apparatus using the same.

2. Related Art

As an example of the diversification of information appliances, a technology for writing characters, figures, etc. on an input panel using a writing tool (indication member), such as a pen, and for displaying the locus of pen input on a display device is known.

As an input panel that is used in combination with this display device, input panels based on various systems, such as an electromagnetic induction system, an electrostatic capacitance system and an optical system, have become commercially practical. In addition, as the display device, various display devices, such as electronic paper based on toner rotation technology, electrophoresis technology, thermal rewritable technology, liquid crystal technology and electrochromic technology, and displays, such as liquid crystal displays and CRTs, are used. The locus of the indication member that makes contact with and moves on the surface of the input panel is displayed on the display section of the display device, thereby being visualized.

In particular, a writing display apparatus is known in which a transparent input panel is disposed so as to be laminated on the display section of the display device and when the indication member moves on the surface of the input panel while making contact therewith, the locus of the indication member making contact with the surface appears as a display image on the display section of the display device (a writing display apparatus having this kind of configuration is referred to as "direct writing display apparatus" in some cases).

SUMMARY

According to an aspect of the invention, a pressure-sensitive display medium includes a pair of transparent substrates, sealing members and a display layer. The pair of transparent substrates are opposed to each other with a distance therebetween. The sealing members seal peripheral fringes of the pair of transparent substrates. The display layer in which a composition obtained by infiltrating a fluidic material in a is porous member is filled in a closed space enclosed with the pair of transparent substrates and the sealing members. When partial pressure is applied from the outside to one face of the transparent substrates, the fluidic material in the display layer at a position to which the pressure is applied is expelled from the porous member. After the pressure is released, the fluidic material having been expelled returns and flows into the porous member.

BRIEF DESCRIPTION OF THE DRAWINGS

Exemplary embodiments of the present invention will be described in detail based on the following figures, wherein.

DETAILED DESCRIPTION

A pressure-sensitive display medium and a writing display apparatus incorporating the pressure-sensitive display medium according to an exemplary embodiment of the present invention will be described below respectively in detail.

[Pressure-Sensitive Display Medium]

Figure 1:
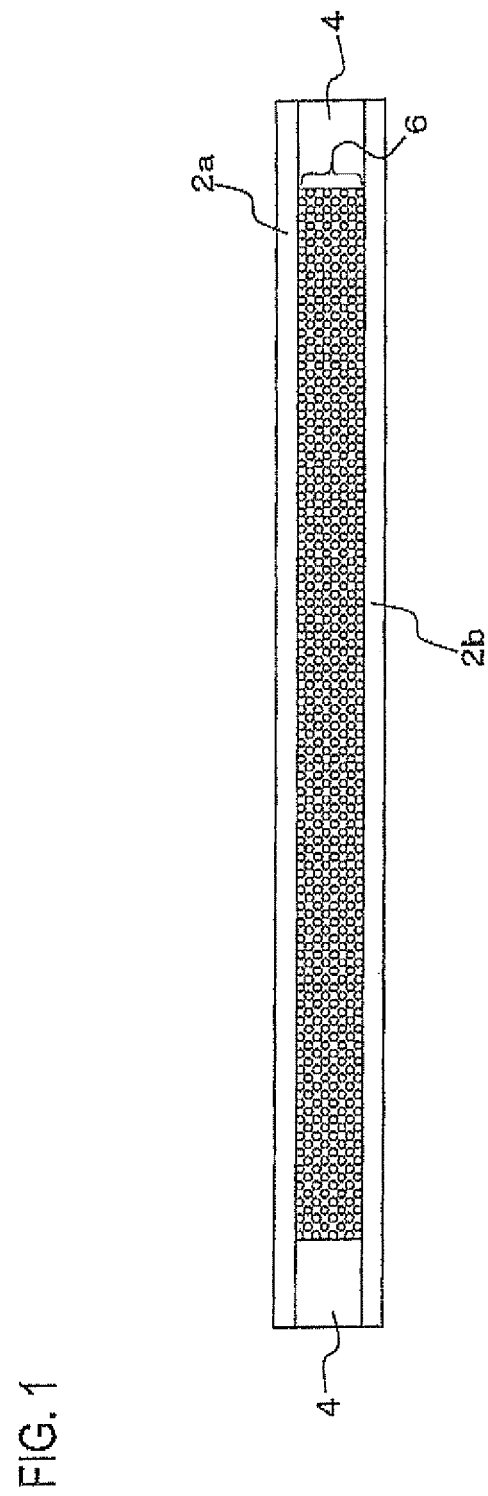
FIG. 1 is a schematic sectional view showing a pressure-sensitive display medium according to an exemplary embodiment of the present invention.

FIG. 1 is a schematic sectional view showing a pressure-sensitive display medium according to an exemplary embodiment of the present invention. The pressure-sensitive display medium according to this embodiment includes a pair of transparent boards (transparent substrates) 2a and 2b opposed to each other with a distance therebetween; sealing members 4 for seating the peripheral fringes of the pair of transparent boards 2a and 2b; and a display layer 6 formed of a composition obtained by infiltrating a fluidic material (hereafter referred to as "refraction liquid") in a porous member and filled in a closed space enclosed with the pair of transparent boards 2a and 2b and the sealing members 4.

Figure 2:
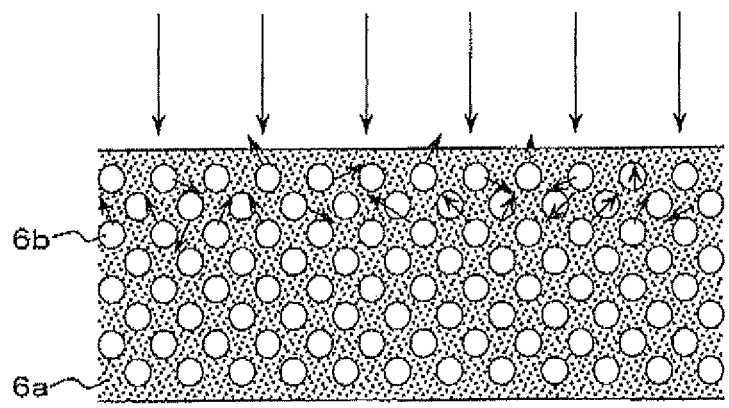
FIG. 2 is a schematic partly enlarged view of a porous member constituting the display layer of the pressure-sensitive display medium shown in FIG. 1, FIG. 2 also showing that light indicated by large arrows is incident onto the porous member, the light is scattered as indicated by small arrows.

FIG. 2 is a schematic partly enlarged view of a porous member 6a constituting the display layer 6 of the pressure-sensitive display medium according to this embodiment shown in FIG. 1. The porous member 6a has numerous pores 6b. In FIG. 2, the refraction liquid is not infiltrated in the pores 6b, but the pores 6b are filled with a gas such as air. Although the pores 6b are shown as being circular in shape in FIG. 2, the pores are only schematically shown, and it is to be understood that the actual shape of the pores of the porous member is generally indeterminate.

Figure 3:
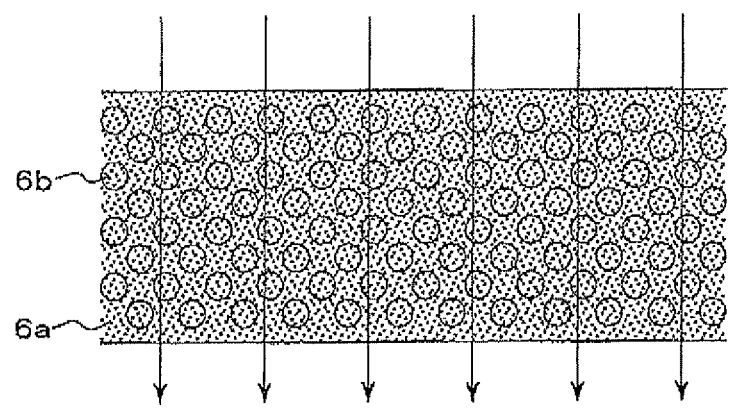
FIG. 3 is a schematic partly enlarged view of a state in which refraction liquid is infiltrated in the porous member shown in FIG. 2, FIG. 3 also showing that light being incident onto the porous member passes through the porous member.
Figure 6:
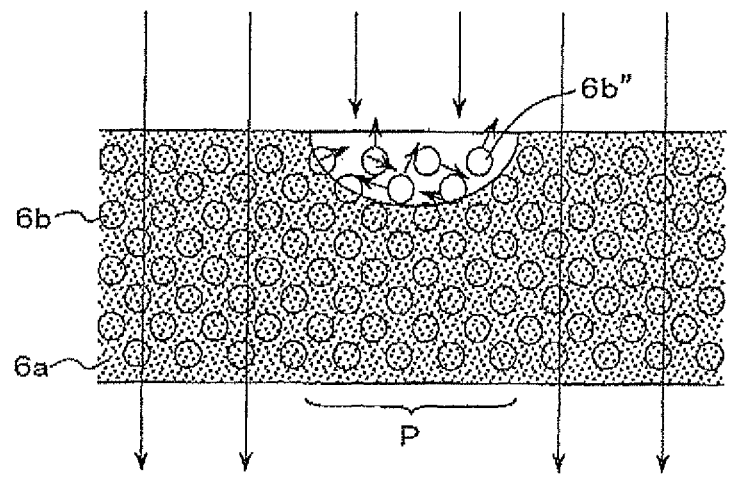
FIG. 6 is a schematic partly enlarged view of a state in which the pressure applied to the porous member being in the state shown in FIG. 4 is released and the porous member has returned to its original shapes this view schematically showing the movement of the fluidic material using arrows, small arrows indicating that light is scattered and can be seen before refraction flows into liquid pores $6b''$.

The arrows in FIG. 2 schematically show the traveling directions of light (the arrows in FIGS. 3 and 6 also show the traveling directions of light). In a state in which only the porous member 6a is present and no refraction liquid exists, the light incident to the interface between the pore 6b and the gas scatters and reflects diffusely as indicated by the short arrows shown in FIG. 2 and develops a color. When a membrane filter suited for the present invention and described later is used, the color appears white.

FIG. 3 is a schematic partly enlarged view of a state in which the refraction liquid is infiltrated in the porous member 6a shown in FIG. 2, and the porous member in which the refraction liquid is infiltrated corresponds to the display layer 6 of the pressure-sensitive display medium according to this embodiment shown in FIG. 1. When the pores 6b of the porous member 6a are filled with the refraction liquid having the same refraction factor as that of the porous member 6a, the gas is expelled, and the refraction factor becomes entirely uniform inside the porous member 6a. As a result, as indicated by the arrows shown in FIG. 3, scattering and diffused reflection do not occurs. The light directly penetrates the layer (display layer 6) formed of the porous member 6a and the refraction liquid, and the layer appears transparent. At this times the smaller the difference in refraction factor between the porous member 6a and the refraction liquid, the more the layer appears transparent.

Figure 4:
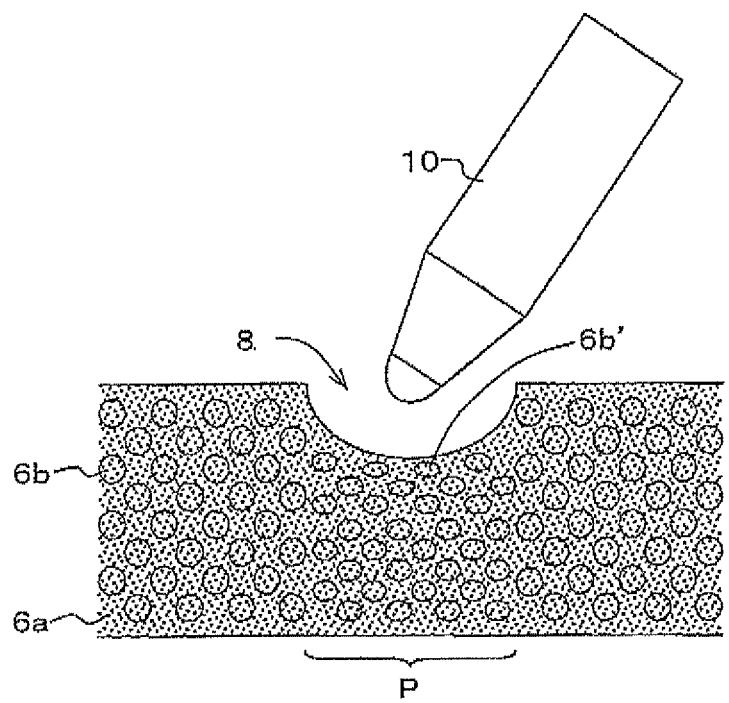
FIG. 4 is a schematic partly enlarged view of a state in which pressure is applied to the porous member in the state shown in FIG. 3 using an indication member.

FIG. 4 is a schematic partly enlarged view of a state in which pressure is applied to the porous member 6a in the state shown in FIG. 3 using an indication member, such as an indication pen. The pressure-sensitive display medium shown in FIG. 4 is different from the pressure-sensitive display medium according to this embodiment shown in FIG. 1 in that the pair of transparent substrates (transparent boards 2a and 2b) is not shown. In reality, however, an indication pen (indication member) 10 presses the porous member 6a via one of the transparent substrates (transparent board 2a) not shown.

A dent 8 is formed in the pressed portion of the porous member 6a in a region P pressed using the indication pen 10. The porous member 6a is crushed together with pores 6b', and the refraction liquid inside the pores 6b' is squeezed out. At this time, the refraction factor changes in the region P after the pressure of the indication pen 10 is released, and the region P develops color, and an image is formed in the pressed region. With the passage of time, the contrast of the image becomes smaller, and the image disappears eventually. Although the principle of this phenomenon is not certain, it is possible to make an assumption as described below.

When the pressure of the indication pen 10 is applied and then released, the region around the dent 8 is recovered to its original state due to the resilience of the transparent board (transparent substrate) not shown, before the porous member 6a is recovered, whereby a space with no refraction liquid is formed. Hence, a difference in refraction factor occurs, and the color of the porous member 6a becomes visible.

On the other hand, the refraction liquid having a high dynamic viscosity cannot return immediately to its original state due to the presence of the pores of the porous member 6a. Hence, an empty space is generated at this instant. The fact that the abrupt change in volume has occurred is assumed to indicate that an adiabatic change or isothermal change has occurred. At this time, the pressure inside the display layer 6 of the pressure-sensitive display medium lowers abruptly. Since the inside is put into a low-vacuum state, the remaining gas dissolved in the refraction liquid is generated as gas in this space.

Figure 5:
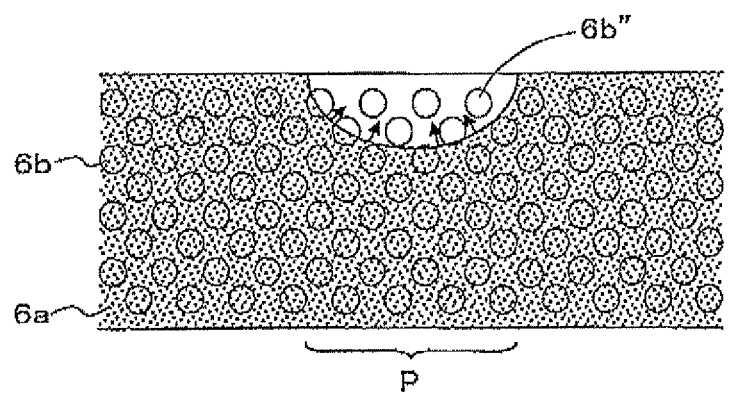
FIG. 5 is a schematic partly enlarged view of a state in which the pressure applied to the porous member being in the state shown in FIG. 4 is released and the porous member has returned to its original shape, schematically showing the movement of the fluidic material using arrows.

Next, the porous member 6a returns to its original shape due to its resilience. FIG. 5 is a schematic partly enlarged view of a state in which the pressure applied to the porous member being in the state shown in FIG. 4 is released and the porous member 6a has returned to its original shape. The arrows in FIG. 5 indicate the movement of the refraction liquid. In addition, FIG. 6 is a schematic partly enlarged view schematically showing the traveling directions of incident light in this state.

The refraction liquid squeezed out from the pores 6b' when the porous member 6a is crushed flows into pores 6b'' in the region that is restored as indicated by the short arrows after the porous member 6a is restored. At this time, the pores 6b'' are in a state of not being sufficiently filled with the refraction liquid until the refraction liquid flows into the pores 6b''.

The porous member 6a, being transparent when the pores 6b'' are in a state of being filled with the refraction liquid, develops color in a state in which the pores 6b'' are not sufficiently filled with the refraction liquid since the scattering and diffused reflection of light occur due to the presence of the pores 6b'' in the region P as shown in FIG. 6.

On the other hand, the above-mentioned space formed inside the display layer 6 disappears with the passage of time since the refraction liquid flows into the pores 6b''. However, the gas generated abruptly cannot be dissolved immediately into the refraction liquid but remains as bubbles. Then, with the passage of time, the generated gas is dissolved again into the refraction liquid and disappears, and the gaps 6b'' are filed with the refraction liquid. Hence, the whole of the porous member 6a gradually returns to a transparent state and eventually to the state shown in FIG. 3, and the image disappears.

The above description is an assumption strictly based on facts, and the assumption does not limit the present invention at all.

As described above, by moving the indication member (indication pen 10) on the transparent board 2a while applying pressure thereto) the pressure-sensitive display medium according to this embodiment can display an image represented by the movement locus of the indication member.

Next, the components of the pressure-sensitive display medium according to the exemplary embodiment of the present invention will be described below.

(Porous Member)

The porous member (6a) according to the exemplary embodiment of the present invention is not particularly limited, but a porous member having an adequate porosity to the extent that the infiltration and extrusion of the refraction liquid occur reversibly and smoothly is selected as necessary. A porous member having a mechanical strength against the stress corresponding to the writing pressure of the user may be used, regardless of the method used to produce the porous member. Since the writing pressure of an adult person using various pens is usually appropriately 0.49 to 4.9 N ($\approx$50 to 500 gf), it is desirable that the porous member has a mechanical strength capable of withstanding the pressure.

The porous member made of an organic resinous material is usually used in view of ease of molding, etc. Examples of methods for forming porous members using organic resins may include the phase inversion method, the drawing method and the filler loading method. These methods will be described below.

In the phase inversion method, an organic resin is dissolved in a solvent and cast and developed on a flat plate to form a film. Part of the solvent is evaporated, and the organic resin is dipped in a bath and coagulated to obtain a porous member in the form of a film.

In the filler loading method, an organic resin is used as a binder. Filer being soluble in a solution that does not react with or become dissolved in a support substrate and the binder is dispersed in the solution, the solution is applied onto the support substrate, and only the filler is subjected to solvent removal to obtain a porous member in the form of a film.

Furthermore, in the drawing method, after a crystalline organic resin is formed into a film, the film is brought into a plastic state by heating or by adding a plasticizing agent, and stretched monoaxially or biaxially to give strain to the film, thereby forming pores and obtaining a porous member in the form of a film.

Examples of specific materials satisfying the characteristics required for the porous member, more specifically, examples of organic resins formed into a film using the phase inversion method and the filler loading method may include cellulose, acetylcellulose (cellulose acetate), nitrocellulose (cellulose nitrate), cellulose-mixed ester, polyamide, poly(methyl methacrylate), polycarbonate, poly(vinyl alcohol) and polyurethane. Furthermore, examples of organic resins formed into a film using the drawing method may include polypropylene, polyethylene and polytetrafluoroethylene (PTFE).

In the case that the thickness of the porous member is 5 to 50 μm, it is preferable that the volume of the pores inside the porous member is in the range of 20 to 80% (in addition to this condition, it is further preferable that the average pore diameter of the pores inside the porous member is in the range of 0.01 to 10 μm) in view of cloudiness. If the porosity is 20% or less, the cloudiness lowers, and high contrast display becomes difficult in some cases. Furthermore, if the porosity is more than 80%, the cloudiness becomes higher, but the strength of the display layer becomes lower, and stable image recording and image maintenance become difficult in some cases.

The average pore diameter of the pores inside the porous member is a factor affecting the display maintenance time of an image. If the diameter is too small or far larger than 10 μm, the cloudiness lowers, and high contrast display becomes difficult. According to the results of experiments conducted by the inventors, the average pore diameter is preferably in the range of 0.01 to 10 μm, further preferably 0.1 to 5 μm. Even if the thickness and the pore diameter of the porous member are in the preferable ranges, the relationship between the two is required that the average pore diameter is smaller than the thickness of the porous member. This is because if the average pore diameter is larger than the thickness of the porous member, at least part of the porous member serving as a light scattering layer has through holes through which light can pass straight, and the concentration and the sharpness of a displayed image become lower.

A specific example of a porous member satisfying the above-mentioned preferred conditions and suited for the present invention may be a membrane filter.

Some kinds of membrane filters are available from the market under the trade name "ADVANTEC", Toyo Roshi Kaisha. Ltd. Specific examples of the membrane filters may include the following.

Cellu-acetate membrane filter (refraction factor: 1.47)
PTFE membrane filter
Hydrophilio PTFE membrane filter
Polycarbonate membrane filter
Cellulose-mixed ester membrane filter (mixture of cellulose acetate and cellulose nitrate) (refraction factor: 1.50)

Among the above-mentioned membrane filters, the membrane filters whose refraction factors are not indicated are products whose refraction factors are not guaranteed by the manufacturer. However, it is all right that such products are used after their refraction factors are measured actually.

A periodic structure in which pores are arranged periodically can also be used as the porous member. Color writing display reflecting only the light having a specific wavelength can be obtained by using the periodic structure as the porous member.

Such periodic structures are detailed in JP 2003-2687 A, JP 2004-170447 A and JP 2005-326596 A. The periodic structures, the methods for producing them, etc. described in these documents, as well as the exemplary embodiments and modifications thereof, are all applicable to the present invention.

(Fluidic Material)

As the fluidic material (refraction liquid) to be infiltrated in the porous member (6a) in the present invention, a fluidic material having a refraction factor close to that of the material constituting the porous member is preferably used. However, the fluidic material is not limited particularly, provided that it is in a liquid state at normal temperature.

It is preferable that the refraction factor of the fluidic material is approximately close to that of the porous member. In view of the transparency in a wet state, the difference between the refraction factors is desired to be close to zero. However, in reality, if the difference is 0.1 or less, it is assumed that the refraction factors are close to each other and the difference is preferable. A difference of 0.05 or less is further preferable.

If the difference between the refraction factor of the material constituting the porous member and that of the fluidic material is larger than 0.1, even if the fluidic material is infiltrated in the porous member, refraction and reflection of light occur at the interface therebetween, and the transparency may be affected in some cases.

As the fluidic material, fluidic materials having excellent transparency and having wettability, that is, the degree to which infiltration into the porous member occurs spontaneously due to capillary force, can be used regardless of the presence/absence of polarity and other electrical characteristics.

With respect to the viscosity of the fluidic material, the maintenance time of the display image is shorter as the dynamic viscosity is closer to zero. However, if the viscosity is too high, the fluid becomes difficult to flow when the indication member is used for writing and pressure is applied, and it becomes difficult to write images. For this reason, the dynamic viscosity of the fluidic material at normal temperature (25° C.) is preferably in the range of 35 to 1250 $mm^2/s$ (cSt), further preferably in the range of 150 to 1250 $mm^2/s$ (cSt).

In addition to the above-mentioned characteristics, such materials as those added to food are particularly preferable in view of safety. Examples of these materials may include edible vegetable oils, more specifically, safflower oil, soybean oil, sunflower oil, nigger oil, corn oil, cotton oil, sesame oil, rapeseed oil, rice oil, kapoc oil, peanut oil, olive oil, palm oil, palm kernel oil, coconut oil and camellia oil. Furthermore, materials for use in cosmetics, such as ethylene glycol, glycerin and liquid paraffin, are colorless and transparent liquids at normal temperature, being safe and having appropriate viscosity values and refraction factors, thereby being able to be used preferably.

In addition, conventionally known liquids being used as refraction liquids and immersion oils (also referred to as immersion liquids, matching liquids, etc. in some cases) can also be used. Examples of such liquids may include refraction liquids (several kinds of refraction liquids having a refraction factor in the range of 1.300 to 2.31 are available) and immersion oils (two kinds of immersion oils having refraction factors of 1.4790 and 1.515 and different viscosity values are available) made by Cargill Inc.

Furthermore, these materials, the viscosity values of which have been adjusted using appropriate solvents having refraction factors approximately equal to those of the materials, can also be used.

Moreover, the refraction factors may also be adjusted by mixing the materials with multiple kinds of liquids or by dissolving other liquids, solids and gases in the materials.

(Transparent Substrate)

In the present invention, the pair of transparent substrates (transparent boards 2a and 2b) is preferably made of a material having shape retaining performance so as to serve as a pressure-sensitive display medium and also having sealing performance, protective performance, etc. for the display layer 6, while having flexibility to the extent that the pressure by writing is transmitted to the display layer (6). Specific examples of resin materials having transparency may include various kinds of organic resin films and sheets (hereafter simply referred to as "films" without making conceptual distinction therebetween) made of materials, such as polyethylene, polyester, polyethylene terephthalate (PET) and polyethylene naphthalate (PEN).

Further specific examples of PET-based products may include Trade name "Lumirror" made by Toray Industries, Inc. and Trade name "COSMOSHINE" made by Toyobo Co., Ltd., and further specific examples of PEN-based products may include Trade name "Teonex" made by Teijin DuPont Films Japan Limited.

In the case that these resin materials are used, in consideration of the fact that the writing pressure of an adult person is appropriately in the range of 0.49 to 4.9 N ($\approx$50 to 500 gf) as described above, the thickness of the transparent substrate is preferably in the range of 25 to 200 µm, further preferably in the range of 50 to 125 µm. If the thickness of the transparent substrate is too large, the load at the indication member (the writing pressure at the tip of a pen) is hardly transmitted to the display layer provided inside, thereby being undesirable. If the thickness is too small, the durability of the porous member of the display layer and the durability of the transparent substrate itself are lowered, thereby being also undesirable.

However, in the case of the transparent board (transparent substrate 2b) on the opposite side of the writing surface, there is no such a limitation in thickness described above. It is rather preferable in some cases that the transparent board has a larger thickness to securely obtain the self-supporting performance, rigidity and durability of the pressure-sensitive display medium itself. Furthermore, in the case that the pressure-sensitive display medium according to the exemplary embodiment of the present invention is applied to a writing display apparatus according to the exemplary embodiment of the present invention described later, the display section of an image display device, such as electronic paper, may make contact with the transparent board 2b disposed on the opposite side the writing surface in some cases. Hence, it is rather preferable in some cases that the transparent board 2b is provided with higher rigidity so that the display section is protected from the pressure of the indication member.

The distance between the pair of transparent substrates is preferably approximately equal to the thickness of the porous member that is filled in the closed space. In reality, it is desirable that production should be performed while the thickness of the sealing members is determined appropriately.

(Sealing Member)

In the present invention, the sealing members (4) are not particularly limited in material and shapes provided that the sealing members are configured to seal the peripheral fringes of the pair of transparent boards (2a and 2b) so that the closed space in which the porous member and the fluidic material constituting the display layer (6) are filled can be formed. In the pressure-sensitive display medium according to this embodiment shown in FIG. 1, the sealing members 4, used as members serving as spacers for maintaining the distance between the pair of transparent boards 2a and 2b, are held therebetween and secured by bonding. It may be possible to provide spacers separately so that the sealing members are used to perform only sealing, for example, sealing is performed using seals or the like.

As a bonding method for sealing, a method for bonding using an adhesive or agglutinant and a method for fusing may also be used.

As the material of the sealing members also playing the role of spacers, the same material as that of the transparent substrates can also be used. Furthermore, various kinds of resin materials other than the material of the transparent substrates, inorganic materials and metal materials can also be used without causing problems. Any of such materials can be used, provided that sealing can be achieved without allowing the fluidic material filled in the closed space to leak and that the material is not corroded by the fluidic material. For example, by the use of double-faced adhesive tape as the sealing member, the close contact and sealing between the two boards can be achieved easily while the double-faced adhesive tape is provided with the function of the spacers.

Still further, the spacers themselves not playing the role of the seating members can also be made of materials similar to those described above.

[Writing Display Apparatus]

Figure 7:
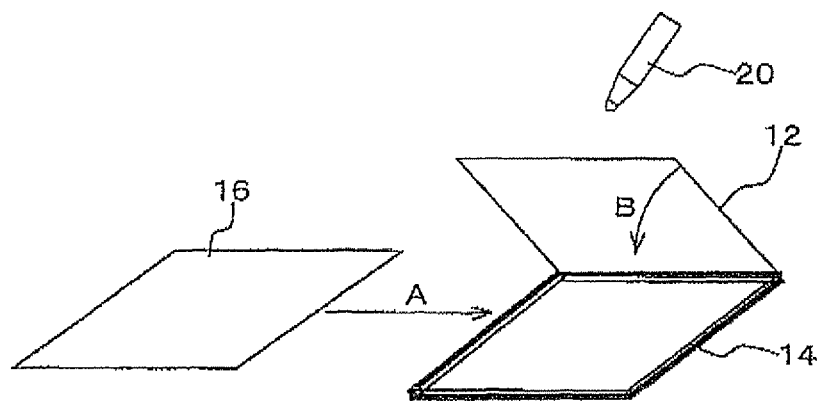
FIG. 7 is a schematic perspective view showing a writing display apparatus according to an exemplary embodiment of the present invention.

FIG. 7 is a schematic perspective view showing the writing display apparatus according to an exemplary embodiment of the present invention. The writing display apparatus according to this embodiment is equipped with a writing information detecting device 14 having an electromagnetic induction type writing information detecting function and constituting the main unit of the apparatus; a pressure-sensitive display sheet (pressure-sensitive display medium) 12 also serving as the cover of the apparatus; an electronic paper sheet (image display device) 16 inserted between the writing information detecting device 14 and the pressure-sensitive display sheet 12; and an electromagnetic induction pen (indication member) 20 for generating an electromagnetic induction wave, the position of which can be detected using the writing information detecting device 14, and for pressing the upper face of the pressure-sensitive display sheet 12 (the face (writing face) opposite to the face (lamination face) making contact with the electronic paper sheet 16, these faces hereafter being referred to similarly as mentioned above).

In this embodiment, as shown in FIG. 7, the writing information detecting device 14 is integrated with the pressure-sensitive display sheet 12, thereby constituting the main unit of the apparatus, and the electronic paper sheet 16 is separated so as to be replaceable.

Figure 8:
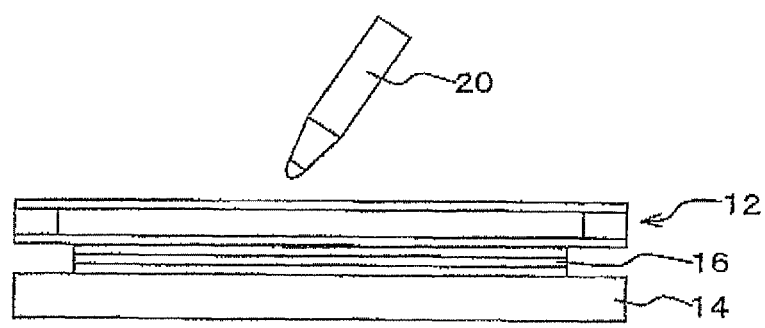
FIG. 8 is a schematic sectional view showing the writing display apparatus shown in FIG. 7 in a state in which an image display device is held between a writing information detecting device and the pressure-sensitive display medium.

The electronic paper sheet 16 is inserted between the writing information detecting device 14 and the pressure-sensitive display sheet 12 as indicated by arrow A and then held therebetween when the pressure-sensitive display sheet 12 is closed in the direction indicated by arrow B. FIG. 8 is a schematic sectional view showing the writing display apparatus according to this embodiment in which the electronic paper sheet 16 is held between the writing information detecting device 14 and the pressure-sensitive display sheet 12.

The electromagnetic induction pen 20 incorporates an induction current generator (not shown) for generating an induction current on the basis of the change in the magnetic field at the tip of the pen (the lower end of the pen shown in FIGS. 7 and 8).

The writing information detecting device 14 generates a predetermined magnetic field on the side of the pressure-sensitive display sheet 12 to perform the electromagnetic induction type writing information detecting function and detects induction current information from the induction current generator depending on the movement of the electromagnetic induction pen 20, thereby determining coordinate axes on the upper face (the face on the side of the electronic paper sheet 16, the face hereafter being referred to similarly as mentioned above), measuring the positions of the movement locus of the electromagnetic induction pen 20 using a sensing circuit and detecting the positions as writing information.

The electromagnetic induction type writing information detecting function is known, and its specific configuration example has been disclosed, for example, in paragraphs [0015] to [0022] of JP 2007-206846 A. Not only this conventional example but also other conventionally known electromagnetic induction type writing information detecting devices and methods can also be applied to the present invention without causing problems.

On the other hand, the pressure-sensitive display sheet 12 is equivalent to the pressure-sensitive display medium according to the exemplary embodiment shown in FIG. 1. An instantaneous display image is directly written by pressing the upper face of the sheet by applying the writing pressure of the electromagnetic induction pen 20.

The electronic paper sheet 16 is a liquid crystal display medium, for example, and displays an image of the shape of the movement locus on its display section depending on the writing information detected using the writing information detecting device 14. The display section is the entire face on the side of the upper face of the electronic paper sheet 16 (the face on the side of the pressure-sensitive display sheet 12, the face hereafter being referred to similarly as mentioned above) and is previously positioned so as to be approximately aligned with the movement locus of the electromagnetic induction pen 20.

The writing information detected using the writing information detecting device 14 is converted into and generated as image information using an image processing device (not shown) and displayed as an image on the display section of the electronic paper sheet 16. This image processing device may be incorporated in the writing information detecting device 14 or the electronic paper sheet 16, or may be provided separately from these and used as an external device. In the case that the device is incorporated, it may be incorporated as a dedicated circuit such as a CPU for image processing or as a microcomputer for performing image processing and other information processing. In the case that the device is used as an external device, the above-mentioned description is applicable similarly, and furthermore, a general-purpose personal computer may also be used as the image processing device.

The process of how an image is written by performing writing using the writing display apparatus according to this embodiment having the above-mentioned configuration will be described below.

Figure 9:
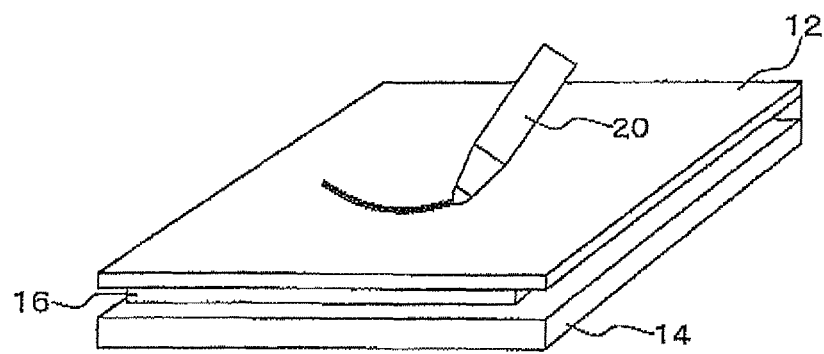
FIG. 9 is a perspective view showing the process of writing an image by writing using the writing display apparatus shown in FIG. 7.

FIG. 9 is a perspective view showing the process of writing an image by performing writing using the writing display apparatus according to this embodiment.

When the electronic paper sheet 16 is inserted between the writing information detecting device 14 and the pressure-sensitive display sheet 12 and held therebetween, the upper face of the pressure-sensitive display sheet 12 becomes the uppermost face. This face becomes the writing face that is pressed with the tip of the electromagnetic induction pen 20 while the pen is moved during writing. When writing is performed on the writing face using the electromagnetic induction pen 20 as shown in FIG. 8, the movement of the pen is recognized as a movement locus and is detected as writing information using the writing information detecting device 14.

Furthermore, the writing information detected using the writing information detecting device 14 is converted into image information using the image processing device (not shown), and displayed as an image on the positioned display section of the electronic paper sheet 16.

Each of the steps of the above-mentioned detection, transmission and processing of information requires an adequate time inevitably, and a certain time lag occurs between the writing and the display of an image. In the case of this embodiment, each of the steps of the detection (sensing) of the writing information using the writing information detecting device 14, the transmission of the writing information to the image processing device, the generation of image data using the image processing device, the driving of a display controller for driving the liquid crystal of the electronic paper sheet 16 and the change in the phase state of the liquid crystal takes a time. Hence, the time lag between the writing and the display of the image is inevitable.

For this reason, the display of the image is delayed behind the movement of the electromagnetic induction pen 20 during writing, and the image is apt to be displayed on the display section at delayed timing. Since this feeling of use is different from that obtained when an image is directly written using an ordinary writing tool, an uncomfortable feeling cannot be eliminated.

However, in this embodiment, the pressure-sensitive display sheet 12 is laminated and disposed on the upper face of the electronic paper sheet 16, and the electromagnetic induction pen 20 makes contact with the upper face of the pressure sensitive display sheet 12 and moves while the tip of the pen presses the upper face. Hence, an image is directly written on the pressure-sensitive display sheet 12, separately from the display on the electronic paper sheet 16.

As a results as the electromagnetic induction pen 20 moves during writing, the image is directly written on the pressure-sensitive display sheet 12, whereby the writer can perform writing while the uncomfortable feeling is relieved. Furthermore, when the pressure-sensitive display sheet 12 serving as the pressure-sensitive display medium according to the exemplary embodiment of the present invention is used, the contrast of the display image lowers with the passage of time, and the display image itself disappears eventually. However, before the image disappears, the image has already been formed on the display section of the electronic paper sheet 16. Hence, the pressure-sensitive display sheet 12 sufficiently plays the role of a bridge to the image formation on the display section. Furthermore, since the display image on the pressure-sensitive display sheet 12 disappears with the passage of time, writing can be performed repeatedly on the electronic paper sheets by removing the electronic paper sheet 16, the writing on which is completed, from the entire apparatus including the writing information detecting device 14 and the pressure-sensitive display sheet 12 and then by replacing the electronic paper sheet with a new one.

Moreover, since the pressure-sensitive display sheet 12 is intervened between the electronic paper sheet 16 and the electromagnetic induction pen 20 without using the display section of the electronic paper sheet 16 as a writing face, an accompanying effect in which damage to the display section due to writing pressure can be relieved is produced.

Although the present invention has been described above in detail by referring to exemplary embodiments, the present invention is not limited to the configurations of the above-mentioned embodiments, but those skilled in the art can add and use conventionally known configurations and various configurations devised for the present invention instead of the configurations of the exemplary embodiments, and any of these configurations are included in the category of the present invention, provided that the configurations have the configurations according to the exemplary embodiment of the present invention.

Some modifications of this embodiment will be described below. However, the present invention is not limited to the following modifications as a matter of course.
(Combination of Apparatus Configuration)

In this embodiment, as shown in FIG. 7, the wilting information detecting device 14 is integrated with the pressure-sensitive display sheet (pressure-sensitive display medium) 12 to form the main unit of the apparatus, and the electronic paper sheet (image display device) 16 is separate from the main unit so as to be replaceable. However, in the present invention, the combination to achieve the integration is not limited to the above-mentioned combination.

For example, it may be possible that the writing information detecting device, the pressure-sensitive display medium and the image display device are all made separate, and when they are used, they are combined to form one writing display apparatus. In this case, by virtue of this separation, the writing information detecting device having a high initial cost can be separated. Furthermore, the pressure-sensitive display medium also playing the role of protecting the display section of the image display device can be replaced easily as the pressure-sensitive display medium is degraded by writing.

Furthermore, for example, it may be possible that the pressure-sensitive display medium is integrated with the image display device and only the writing information detecting device is separated. By virtue of the configuration in which only the writing information detecting device is separated, the writing information detecting device having a high initial cost can be separated.

Moreover, it may be possible that the writing information detecting device is integrated with the image display device and only the pressure-sensitive display medium is separated. By virtue of the configuration in which only the pressure-sensitive display medium is separated, the pressure-sensitive display medium also playing the role of protecting the display section of the image display device can be replaced easily as the pressure-sensitive display medium is degraded by writing.

On the other hand, it may be possible that the writing information detecting device, the pressure-sensitive display medium and the image display device are all integrated so that the writing display apparatus has a configuration in which all the functions ranging from writing to display are put together. In this case, by virtue of the integrated configuration, writing can be performed at any time.
(Type of Image Display Device)

Although the electronic paper sheet 16 serving as a liquid crystal display medium is used as the image display device in this embodiment, the image display device according to the present invention is not limited to the electronic paper sheet 16. Any image display device may be adopted instead of the electronic paper sheet 16, provided that the image display device has a function of displaying an image of the shape of the above-mentioned movement locus on the display section depending on the writing information detected using the writing information detecting device.

Examples of the image display device that can be adopted may include not only the liquid crystal display device used in this embodiment but also the so-called electronic paper sheets, such as a device that uses toner rotation, a device that uses electrophoresis, a thermal rewritable device and an electrochromic device, as preferred devices. Furthermore, devices, such as a CRT (cathode ray tube) and an organic EL (electroluminescence) device, are also applicable.
(Type of Writing Information Detecting Device)

The electromagnetic induction type writing information detecting device 14 is used as the writing information detecting device in this embodiment. However, in the present invention, the writing information detecting device is not limited to the writing information detecting device 14. Any writing information detecting device may be adopted instead of the writing information detecting device 14, provided that the writing information detecting device has a function of detecting the movement locus of the indication member on the writing face as writing information.

Examples of the writing information detecting device that can be adopted may include not only the electromagnetic induction type writing information detecting device used in this embodiment but also a handwritten script input system (refer to JP 2007-206907 A) that detects the position of an electronic pen (indication member) as writing information on the basis of the time difference between the transmission and reception with combination of an infrared ray and an ultrasonic sound wave, a resistive film type apparatus and an optical imaging system (refer to JP 2006-277492 A), and these are also applicable.
(Disposition of Light Absorbing Filter)

In this embodiment, the writing information detecting device 14 and the pressure-sensitive display sheet (pressure-sensitive display medium) 12 are laminated so as to make contact with each other. However, a light absorbing filter (light absorbing layer) may be intervened between the two.

Figure 10:
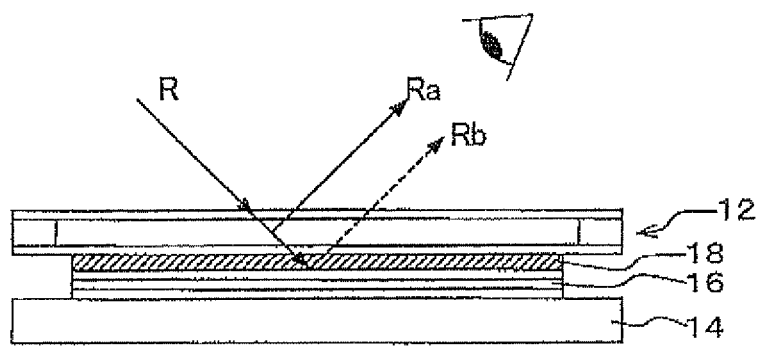
FIG. 10 is a schematic sectional view showing a writing display apparatus according to a modification of the writing display apparatus shown in FIG. 7 in which a light absorbing filter is additionally disposed.

FIG. 10 is a schematic sectional view showing a writing display apparatus according to a modification in which a light absorbing filter is additionally disposed in the apparatus according to this embodiment. In the writing display apparatus shown in FIG. 10, a light absorbing filter 18 is held between the pressure-sensitive display sheet 12 and the electronic paper sheet 16 in the writing display apparatus shown in FIG. 8.

The display image on the pressure-sensitive display sheet 12 is recognized by a viewer via reflected light. Hence, in the case that the light absorbing filter 18 is not disposed (in the case of this embodiment), the visibility of the image changes depending on the display state of the electronic paper sheet 16 positioned under the pressure-sensitive display sheet 12. For example, when white is displayed on the electronic paper sheet 16, all the wavelength components (Rb) inside incident light R are returned to the viewer, whereby viewing becomes difficult due to the effect of additive color mixture. For the purpose of solving this problem, the light absorbing filter 18 is inserted between the pressure-sensitive display sheet 12 and the electronic paper sheet 16 in this modification so that the color development on the pressure-sensitive display sheet 12 can be viewed easily.

In the case that the electronic paper sheet 16 and the pressure-sensitive display sheet 12 can be separated (the two are not necessarily required to be separated completely from each other), the light absorbing filter 18 to be held therebetween can also be removable. If the light absorbing filter 18 is disposed during ordinary times, such as at the time of image display, the display image on the electronic paper sheet 16 becomes dark. Hence, the display image can be viewed easily by removing the light absorbing filter 18 during ordinary times and by inserting the light absorbing filter 18 only at the time of writing.

Although the light absorbing filter 18 and the pressure-sensitive display sheet 12 are separate in this modification, the two may be joined together and integrated. Furthermore, the transparent board 2b (see FIG. 1) of the pressure-sensitive display sheet 12 may be provided with the function of the light absorbing filter.

The light absorbing filter is inserted between the pressure-sensitive display medium (pressure-sensitive display sheet 12) and the display section of the image display device (electronic paper sheet 16) and then used. The light absorbing filter is inserted so that the color displayed on the pressure-sensitive display medium can be viewed easily. From this point of view, the optical transmittance of the light absorbing filter should be lower. However, if the optical transmittance is too low, the display on the image display device becomes difficult to view. For this reason, the optical transmittance of the light absorbing filter is preferably in the range of 0.1 to 1.0, further preferably in the range of 0.1 to 0.4.

More specifically, a light quantity adjusting filter (ND filter) made by FUJIFILM Corporation can be taken as a exemplary example of the tight absorbing filter.
(Disposition of Transparent Hard Board)

A transparent hard board (transparent hard layer) may also be intervened between the writing information detecting device 14 and the pressure-sensitive display sheet (pressure-sensitive display medium) 12.

Figure 11:
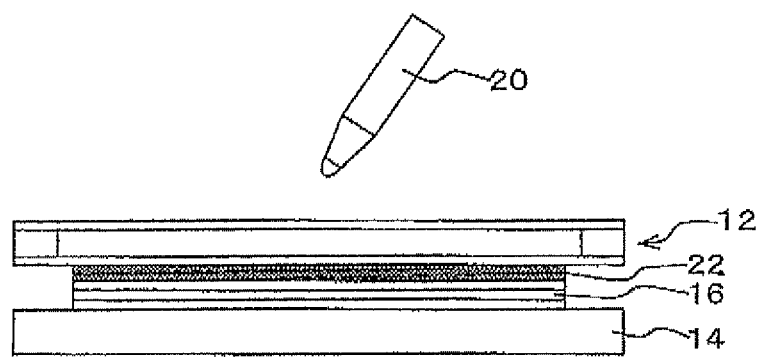
FIG. 11 is a schematic sectional view showing a writing display apparatus according to another modification of the writing display apparatus shown in FIG. 7 in which a transparent hard board is additionally disposed.

FIG. 11 is a schematic sectional view showing a writing display apparatus according to another modification in which a transparent hard board is additionally disposed in the apparatus according to this embodiment. In the writing display apparatus shown in FIG. 11, a transparent hard board 22 is held between the pressure-sensitive display sheet 12 and the electronic paper sheet 16 in the writing display apparatus shown in FIG. 3.

In the case that the transparent hard board 22 is not disposed (in the case of this embodiment), the display section of the electronic paper sheet 16 positioned under the pressure-sensitive display sheet 12 makes direct contact therewith. Because of the inherent function of the pressure-sensitive display sheet 12, an image is written while the pressure-sensitive display sheet 12 itself is deformed by the writing pressure of the indication member, such as the electromagnetic induction pen 20. Hence, in the state in which the display section of the electronic paper sheet 16 makes contact with the pressure-sensitive display sheet 127 there is a fear that a load is applied to the display section due to the writing pressure of the indication member. Hence, the transparent hard board 22 having optical transparency is inserted between the pressure-sensitive display sheet 12 and the electronic paper sheet 16 to protect the display section of the electronic paper sheet 16 from the writing pressure of the indication member.

In the case that the electronic paper sheet 16 and the pressure-sensitive display sheet 12 can be separated (the two are not necessarily required to be separated completely from each other), the transparent hard board 22 can also be removable, as in the case of the light absorbing filter 18.

Although the transparent hard board 22 and the pressure-sensitive display sheet 12 are separate in this modification, the two may be joined together and integrated. Furthermore, the transparent board 2b (see FIG. 1) of the pressure-sensitive display sheet 12 may be hardened so as to be provided with the function of the transparent hard board 22.

Moreover, the transparent hard board 22 may also be provided with the function of the light absorbing filter 18.

The transparent hard board being usable for the present invention is required to have transparency so that the display image on the image display device (electronic paper sheet 16) disposed thereunder can be recognized. In addition, the transparent hard board is desired to have a hardness so as to be able to protect the display section of the image display device from a load due to the pressure of the indication member. Even if the hardness is insufficient, it is expected that only the presence of the transparent hard board between the pressure-sensitive display sheet 12 and the electronic paper sheet 16 will produce a protective effect in comparison with a configuration without the transparent hard board. Specific examples of preferred materials of the transparent hard board may include glass and plastic.

EXAMPLES

The present invention will be described more specifically by taking Examples.

Example 1

Two polyethylene terephthalate (PET) films (60 mm×90 mm×100 µm) are prepared. On the other hand, a double-faced adhesive sheet (Trade name: Neo Fix made by Nichiei Kasei Co., Ltd., 100 µm in thickness) is cut into a size of 60 mm×90 mm, and the inside area thereof is cut off while a width of 5 mm is left around the outer periphery, whereby a double-faced adhesive sheet having a picture frame shape is prepared. The release paper on one side of the double-faced adhesive sheet is removed, and the double-faced adhesive sheet is attached to the outer fringe section of one of the PET films without leaving any space therebetween.

On the other hand, Immersion Oil, type 300 (refraction factor: 1.5150, dynamic viscosity: 300 mm$^2$/s (cSt)), made by Cargill Inc. and serving as a refraction liquid, is infiltrated into a cellulose-mixed ester membrane filter (Trade name. A500A047A, made by ADVANTEC MFS, INC., dimensions, 47 mm in diameter, 5 µm in pore diameter, refraction factor: 1.50) serving as a porous member. The membrane filter is then placed at the center of the PET film, to the outer fringe section of which the above mentioned double-faced adhesive sheet is attached. The release paper on the other side of the double-faced adhesive sheet is removed, and then the other PET film prepared is attached to the double-faced adhesive sheet so as to be laminated.

Since the membrane filter held between the two PET films having a rectangular shape is circular, an extra space in which the membrane filter is not present is generated in the closed space enclosed with the two PET films and the double-faced adhesive sheet having a picture frame shape. Sealing is done carefully so that air bubbles are prevented from entering the extra space by filling the extra space with the refraction liquid.

As described above, a pressure-sensitive display medium according to Example 1 having a configuration approximately similar to that shown in FIG. 1 is produced in which the PET films are used as the transparent boards 2a and 2b and the double-faced adhesive sheet is used as the sealing members 4.

Example 2

A pressure-sensitive display medium according to Example 2 having a configuration approximately similar to that shown in FIG. 1 is produced as in the case of Example 1 except that Standard, Series A (refraction factor: 1.510, dynamic viscosity: 35 mm$^2$/s (cSt)), made by Cargill Inc. is used as the refraction liquid in Example 1.

Example 3

A pressure-sensitive display medium according to Example 3 having a configuration approximately similar to that shown in FIG. 1 is produced as in the case of Example 1, except that Immersion Oil, type B (refraction factor: 1.510, dynamic viscosity: 1250 mm$^2$/s (cSt)), made by Cargill Inc. is used as the refraction liquid in Example 1.

Example 4

A pressure-sensitive display medium according to Example 4 having a configuration approximately similar to that shown in FIG. 1 is produced as in the case of Example 1, except that a hydrophilic PTFE-based membrane filter (Trade name: H100A047A, made by ADVANTEC MFS, INC., dimensions: 47 mm in diameter, 1 μm in pore diameter, refraction factor: 1.35) is used as the porous member and purified water (refraction factor: 1.33, dynamic viscosity: 13 mm$^2$/s (cSt)) is used as the refraction liquid in Example 1. In the pressure-sensitive display medium obtained in Example 4, even if the refraction liquid is expelled from the porous member when partial pressure is applied from the outside, the refraction liquid returns and flows into the porous member immediately after the pressure is released.

Comparison Example 1

A pressure-sensitive display medium according to Comparison example 1 having a configuration approximately similar to that shown in FIG. 1 is produced as in the case of Example 1, except that Immersion Oil, type NVH (refraction factor: 1.510, dynamic viscosity: 21000 mm$^2$/s (cSt)), made by Cargill Inc. is used as the refraction liquid in Example 1. Even if partial pressure amounting up to approximately 5000 N, the maximum writing pressure of an adult person using various pens, is applied from the outside to the pressure-sensitive display medium obtained in Comparison example 1, the refraction liquid cannot be expelled from the porous member.

(Writing Test)

In the various pressure-sensitive display media obtained according to Examples 1 to 4 and Comparison example 1, with reference to the method for evaluating scratch hardness according to JIS K5600, a constant pressure is applied as a load, and an evaluation system capable of conducting a scratching test at a constant speed is made, and evaluation is performed. A writing test is conducted in which a member having a tip made of polyacetal, 0.75 mm in diameter, is used as an indication member instead of a pencil, the indication member is set so that a load of 2.9 N (300 gf) is applied to one face of each pressure-sensitive display medium, and the indication member is moved at a constant speed of 50 mm/sec. The states of images immediately after writing are evaluated according to the evaluation criteria described below. In addition, the states during writing and thereafter are recorded using a camcorder, color development states and display maintenance times are checked, and then evaluation is performed similarly according to the evaluation criteria described below. The results are shown in Table 1 given below.

A: An image of a clear written line can be recognized visually.
B: An image of a discontinuous written line can be recognized visually.
C: A written image can be recognized visually only at the initial position in which a load is applied.
D: No written image can be recognized visually.

TABLE 1

|  | Immediately after writing | After 0.5 sec | After 1 sec |
|---|---|---|---|
| Example 1 | A | A | A |
| Example 2 | B | B | C |
| Example 3 | B | B | C |
| Example 4 | C | D | D |
| Comparison example 1 | D | D | D |

As understood from the results shown in Table 1 given above, in the pressure-sensitive display media according to Examples 1 to 4 in which the refraction liquid is expelled from the porous member when partial pressure is applied from the outside and the refraction liquid returns and flows into the porous member when the pressure is released, it is understood that a written image is displayed immediately after writing.

Furthermore, in Examples 2 and 3, it can be confirmed that the written image is erased gradually with the passage of time. Moreover, in Example 4, it is understood that the written image displayed immediately after writing is erased quickly. On the other hands in Example 1 the image of the written line is maintained clearly even after one second has passed after writing. It is thus understood that the maintenance performance of the display image is high.

Although Table 1 given above only shows the states of the display images obtained one second after the writing, it has been confirmed that the display image on the pressure-sensitive display medium according to Example 1 is erased five seconds after the writing.

On the other hands even if partial pressure amounting up to approximately 5000 N, the maximum writing pressure of an adult person using various pens, is applied from the outside to the pressure-sensitive display medium obtained in Comparison example 1, the refraction liquid cannot be expelled from the porous member. Hence, it is understood that the written image is not displayed even immediately after the writing.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A pressure-sensitive display medium comprising:
a pair of transparent substrates opposed to each other with a distance therebetween;
sealing members that seal peripheral fringes of the pair of transparent substrates; and
a display layer in which a composition obtained by infiltrating a fluidic material in a porous member is filled in a closed space enclosed with the pair of transparent substrates and the sealing members, wherein:
a difference between a refraction factor of the fluidic material and a refraction factor of the porous member is 0.1 or less,
the porous member has a pore volume of between 20% to 80%,
an average pore diameter of the porous member is between 0.01 μm to 10 μm,
when partial pressure is applied from the outside to one face of the transparent substrates, the fluidic material in the display layer at a position to which the pressure is applied is expelled from the porous member, and
after the pressure is released, the fluidic material having been expelled returns and flows into the porous member:
when a portion of the porous member contains the fluidic material, the portion of the porous member is transparent; and
when the portion of the porous member does not contain the fluidic material, the portion of the porous member is opaque.

2. The pressure-sensitive display medium according to claim 1, wherein the dynamic viscosity of the fluidic material at about 25° C. is in the range of about 35 to about 1250 mm2/s.

3. The pressure-sensitive display medium according to claim 1, wherein the porous member is a periodic structure.

4. The pressure-sensitive display medium according to claim 1, wherein the porous member includes a matrix material with a plurality of discrete pores distributed throughout the material.

5. The pressure-sensitive display medium according to claim 1, wherein the difference between a refraction factor of the fluidic material and a refraction factor of the porous member is 0.05 or less.

6. The pressure-sensitive display medium according to claim 1, wherein a thickness of the transparent substrate to which pressure is applied is 25 μm to 200 μm.

7. The pressure-sensitive display medium according to claim 1, wherein a thickness of the transparent substrate to which pressure is applied is 50 μm to 125 μm.

8. A writing display apparatus comprising:
a writing information detecting device that detects a movement locus of an indication member with respect to a writing face as writing information;
an image display device that displays an image of a shape of the movement locus on a display section thereof depending on the writing information detected using the writing information detecting device; and
the pressure-sensitive display medium according to claim 1 laminated on the display section of the image display device directly or via another layer, in which a face on the opposite side of a laminated face serves as the writing face on which the indication member moves while applying pressure.

9. The writing display apparatus according to claim 8, further comprising:
a light absorbing layer intervened between the display section of the image display device and the pressure-sensitive display medium.

10. The writing display apparatus according to claim 8, further comprising:
a transparent hard layer intervened between the display section of the image display device and the pressure-sensitive display medium.

* * * * *